Sept. 2, 1969  R. J. FRANKLIN  3,464,134
MAGNETIC DISPLAY
Filed June 22, 1966
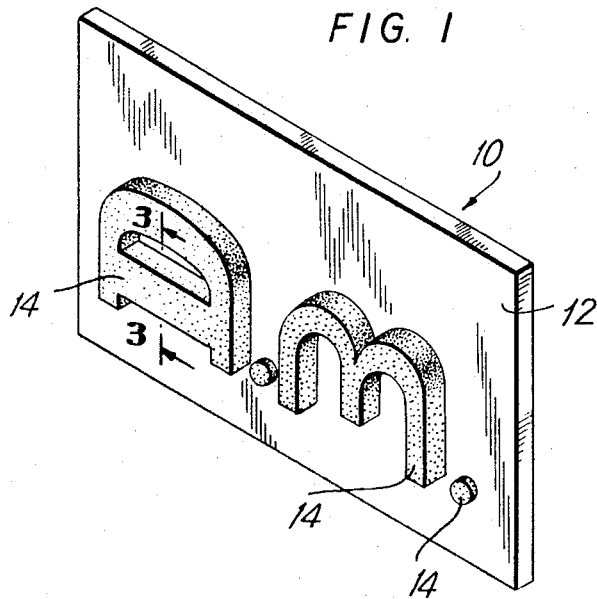
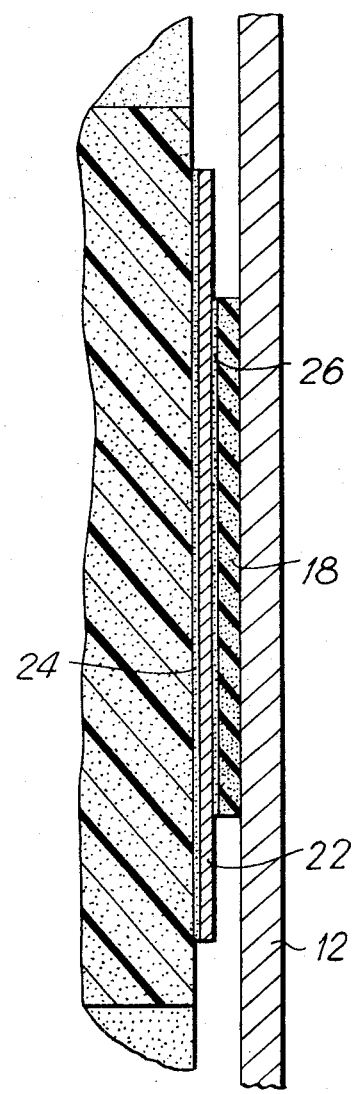
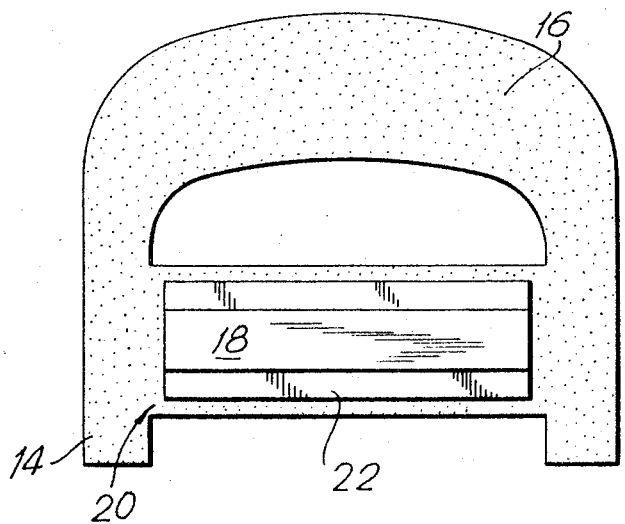
INVENTOR.
ROBERT J. FRANKLIN
BY
*Blum, Moscovitz, Freedman, Blum & Kaplan*
ATTORNEYS

United States Patent Office

3,464,134
Patented Sept. 2, 1969

3,464,134
MAGNETIC DISPLAY
Robert J. Franklin, New York, N.Y., assignor to Schenley Industries, Inc., New York, N.Y., a corporation of Delaware
Filed June 22, 1966, Ser. No. 560,384
Int. Cl. G09f 7/02
U.S. Cl. 40—142                                        7 Claims

ABSTRACT OF THE DISCLOSURE

A display assembly enabling display elements, such as letters of the alphabet, for example, to be removably mounted on a suitable support means. The support means is made of a magnetizable material, and a display member is situated in front of and adjacent to this support means. A magnetic tape is situated between the display member and the support means in engagement with the latter so as to be magnetically attracted thereto. A mounting means mounts the tape on the display member so that the latter is carried by the tape while the tape is magnetically held on the support means. Between the magnetic tape and the display member is metallic plate which is also of a magnetizable material, so that the magnetic tape is sandwiched between the magnetic support means and the magnetic metallic plate to provide an exceedingly effective support for the display member.

---

The present invention relates to displays, such as, for example, advertising displays in which one or more display members are arranged to provide a display in the form of a sign or the like.

The present invention relates in particuler to a structural arrangement for securing display members to a suitable magnetizable supporting surface.

A primary object of the present invention is to provide a structural arrangement which operates magnetically for securing a display member to a magnetizable support.

In particular, it is an object of the invention to provide a structural arrangement which is exceedingly inexpensive and simple while at the same time permitting display members to be reliably secured to a suitable support or supporting surface in a magnetic manner requiring only placing of the display members against the support or supporting surface for retaining the display members at selected positions. Pursuant to this object of the present invention, the display member may be facilely and quickly installed and removed to form any desired or different display thus providing extreme versatility of display coupled with a minimum loss of advertising time. Thus the displays formed are inherently of low cost both initially and by virtue of the aforenoted versatility, as well as maximizing the advertising time available by means of such displays.

Primarily, in accordance with the invention, the display member will have at its rear face, which is not seen when the display is vewed from the front thereof, a magnetic tape mounted on the display member by mounting means in accordance with the present invention in such a way that the tape is exposed at the rear face of the display member, so that by placing the tape in engagement with a support made of a magnetizable material, the display member will be magnetically held at a preselected position on the support with the front face of the display member visible to a viewer of the display.

The invention is illustrated by way of example in the accompanying drawings which form part of this application and in which:

FIG. 1 shows one possible embodiment of a display according to the invention in a perspective view;

FIG. 2 is a rear elevation of a display member of the invention which is adapted to be mounted on a magnetizable surface or support; and FIG. 3 is a fragmentary section taken along line 3—3 of FIG. 1 in the direction of the arrows and showing the structure on a scale larger than FIG. 1.

Referring to FIG. 1, there is shown in display 10 including a support 12 and a plurality of display members 14 carried thereby. In the illustrated example these display members are made of expanded plastic, such as Styrofoam, so that while being relatively rigid they are nevertheless of light weight and admirably suited to the present application. The support 12 may be of any suitable form and in the illustrated embodiment takes the form of a metallic plate or sheet material made of a magnetizable material such as a suitable ferrous metal. The display members 14 carry at their rear faces, which are not visible from the front of the display 10, the structural arrangement of the invention for detachably securing the display members 14 on the magnetizable surface or support 12.

Referring to FIGS. 2 and 3, each display member 14 has a rear face 16 in the region of which is situated a magnetic tape 18, in accordance with the present invention. This magnetic tape is available on the open market and comes in varying widths, lengths and thicknesses and is relatively inexpensive. The magnetic tape 18 is of course flexible and may or may not be stretchable and may be readily severed into any desired lengths.

The magnetic tape 18 is mounted in the region of the rear face 16 of the display member 14 by a mounting means 20 in such a way that the magnetic tape 18, while being secured to the display member 14, is exposed at the rear face thereof. Thus, in order to secure the member 14 to the magnetizable surface 12 the operator need only place the exposed magnetic tape 18 in engagement with the magnetizable surface 12, and by reason of the magnetic attraction of the tape 18 to the magnetizable surface 12 the tape 18 is capable of reliably securing the display member 14 at any selected location on the magnetizable surface 12.

The mounting means 20, in accordance with the invention, takes the form of a plate 22 of metallic magnetizable material. Thus the plate 22 may be for example of ferrous metal. It will be noted that the plate 22 laterally projects beyond the magnetic tape 18, but this projection is optional. In the example illustrated the magnetic tape 18 is of a rectangular configuration and the mounting plate 22 is also of a rectangular configuration having the same length as the tape 18 but being wider than the latter. The tape 18 is centrally carried by the mounting plate 22 extending longitudinally thereof, so that the plate 22 projects laterally beyond the opposed side edges of the tape 18.

Because of the magnetizable properties of the mounting plate 22, it measurably increases the magnetic holding power of the tape 18 and thus contributes to the supporting reliability with which a display member 14 is secured to the magnetizable surface 12. Accordingly a relatively large display member may be secured to a support 12 by the magnetic mounting arrangement of the present invention.

In the illustrated example, the metallic plate 22 is secured to the rear face of the plastic display member 14 by a layer 24 of a suitable adhesive, and the same or other adhesive can be used to form a bonding layer 26 (FIG. 3) between the magnetic tape 18 and the plate 22. It will be understood that any other desired securement means can be utilized to secure plate 22 between the display member and the tape.

The tape 18 and the plate 22 can be cut into any lengths and given any desired configuration, so that the structure of the invention is easily adapted to display members 14 of any configuration, and the magnetic structure 18, 22 can be made of any size large enough to provide a required magnetic holding power for reliably supporting a display member 14 on the magnetizable support 12 while at the same time being small enough to be situated at the rear face 16 without being visible at the front face of the display member.

In setting up the display 10, the operator need only select the display members 14 which are to be used and place them next to the magnetizable surface or support 12 in any selected arrangement, and by engaging the magnetizable surface 12 the magnetic tapes 18 will reliably secure the display members 14 in the preselected positions. These members 14 can be just as easily removed simply by being pulled away from the magnetizable surface 12 or with the aid of any suitable prying implement. Each display member 14 has its own magnetic securing means 18, 22 permanently connected thereto, and this means 18, 22 does not appreciably increase the weight of a display member, so that the display members of the invention remain very light and are capable of being very easily handled and placed in any desired location.

This display members 14 can be used to set up other or different signs at the same or different locations very quickly thereby providing a maximum of versatility with a minimum of loss of advertising time.

As is apparent from the drawing, the display members 14 have a substantial thickness and the total thickness of the tape 18 and metallic plate 22, together with layers of adhesive 24 and 26, is only a small fraction of the total thickness of a display member 14. In this way, the display member 14 will be spaced forwardly from the front surface 12 by only an exceedingly narrow gap which does not in any way interfere, when the assembly is viewed from the front, with giving the illusion that the display members 14 directly engage the surface 12. It is particularly to be noted that this latter result is achieved simply by attaching the metallic plate 22 directly to the rear surface of the display member 14 without requiring the latter to be formed with any grooves, recesses, or the like to accommodate the magnetic structure which holds the display member on the support. It is therefore possible to make the display members 14 of solid blocks of material, preferably in the form of a light foam plastic, as pointed out above.

The magnetic tape has the N-S poles thereof on its opposite surfaces rather than its ends, so that the increased magnetic attraction is brought about by the metal plate 22.

What is claimed is:

1. For use in a display, a display member having front and rear faces, a magnetic tape situated in the region of said rear face of said member, and mounting means mounting said tape on said display member in a position where said tape is exposed in the region of said rear face of said display member, so that said tape can be placed in engagement with a magnetizable support member to be magnetically attracted thereto for supporting said display member with its front face exposed, said mounting means being in the form of a magnetizable metallic plate adhesively secured to said rear face of said display member and said magnetic tape being adhesively secured to said plate to be sandwiched between the latter and a magnetizable support member which said tape engages.

2. The combination of claim 1 and wherein said display member is made of expanded plastic.

3. The combination of claim 1 and wherein the total thickness of said tape and metallic plate is a small fraction of the thickness of said display member.

4. The combination of claim 3 and wherein said total thickness is small enough to provide between the display member and a magnetizable support member on which it is mounted a gap sufficiently narrow to provide from the front of the display member the illusion that the latter directly engages the support member.

5. A display comprising support means made of a magnetizable material, a display member situated in front of and adjacent to said support means, a magnetic tape situated between said display member and support means engaging the latter and magnetically attracted thereto, and a magnetizable metallic plate secured to said display member and to which said tape is secured sandwiched between said plate and said support means so that said display member is carried by said tape while said tape is magnetically held on said support means.

6. The combination of claim 5 and wherein said display member is made of Styrofoam.

7. The combination of claim 5 and wherein said display member has a flat rear surface to which said metallic plate is adhesively secured, and said magnetic tape being adhesively secured to said metallic plate between the latter and said support means, said support means having a surface parallel to the rear face of said display member and spaced therefrom by a distance approximately equal to the total thickness of said metallic plate and tape, said total thickness being a small fraction of the total thickness of said display member and being small enough to provide between the display member and support means a gap narrow enough to provide from the front of the display member the illusion that the latter is directly mounted on the support means.

References Cited

UNITED STATES PATENTS

| | | | |
|---|---|---|---|
| 2,254,498 | 9/1941 | Scharf | 40—142 |
| 2,784,510 | 3/1957 | Jaye | 40—135 |
| 3,257,586 | 6/1966 | Steingroever | 335—303 |

FOREIGN PATENTS 393,901  11/1967  Switzerland.

OTHER REFERENCES

Pp. 65–68, "Product Engineering," Jan. 9, 1961.

EUGENE R. CAPOZIO, Primary Examiner

W. J. CONTRERAS, Assistant Examiner